United States Patent [19]
Fisher

[11] Patent Number: 6,158,929
[45] Date of Patent: Dec. 12, 2000

[54] ELECTRONICALLY TRIGGERED SURFACE SENSOR UNIT

[75] Inventor: David Fisher, Balderstone, United Kingdom

[73] Assignee: BAE Systems plc, Farnborough, United Kingdom

[21] Appl. No.: 09/434,260

[22] Filed: Nov. 5, 1999

Related U.S. Application Data

[63] Continuation of application No. PCT/GB99/02061, Jun. 30, 1999.

[30] Foreign Application Priority Data

Jul. 1, 1998 [GB] United Kingdom ............ 9814244
Apr. 27, 1999 [GB] United Kingdom ............ 9909519

[51] Int. Cl.[7] .................... B23B 35/00; B23B 49/00
[52] U.S. Cl. .................. 408/1 R; 408/10; 408/14; 408/202; 408/16
[58] Field of Search .................. 408/1 R, 10, 11, 408/12, 13, 14, 15, 16, 72 R, 202, 241 S

[56] References Cited

U.S. PATENT DOCUMENTS

| | | |
|---|---|---|
| 3,724,964 | 4/1973 | Needham, Jr. . |
| 4,090,802 | 5/1978 | Bilz .............................................. 408/11 |
| 4,115,017 | 9/1978 | Wilhelmsson . |
| 4,425,060 | 1/1984 | Bilz et al. .................................... 408/6 |
| 4,507,025 | 3/1985 | Fedor ........................................ 408/11 |
| 4,610,578 | 9/1986 | Miyakawa . |
| 4,761,101 | 8/1988 | Zetti ............................................ 408/6 |
| 4,778,313 | 10/1988 | Lehmkuhl . |
| 4,809,426 | 3/1989 | Takeuchi et al. . |
| 5,018,911 | 5/1991 | Stursberg . |
| 5,248,229 | 9/1993 | Bilz ............................................ 408/16 |
| 5,393,288 | 2/1995 | Miyasaka et al. . |

FOREIGN PATENT DOCUMENTS

| | | |
|---|---|---|
| 0 139 847 | 5/1985 | European Pat. Off. . |
| 0 470 425 | 2/1992 | European Pat. Off. . |
| 0 565 748 | 10/1993 | European Pat. Off. . |
| 0 584 412 | 3/1994 | European Pat. Off. . |
| 0 591 096 | 4/1994 | European Pat. Off. . |
| 3912991 | 10/1990 | Germany ................................ 408/15 |
| 111117 | 5/1991 | Japan ...................................... 408/16 |
| 129609 | 4/1992 | Japan ...................................... 408/16 |
| 270016 | 9/1994 | Japan ...................................... 408/16 |
| 3234194 | 11/1972 | U.S.S.R. ................................. 408/13 |
| 565964 | 12/1944 | United Kingdom . |
| 1507536 | 4/1978 | United Kingdom . |
| 2 247 634 | 3/1992 | United Kingdom . |
| 2 319 670 | 5/1998 | United Kingdom . |

Primary Examiner—Daniel W. Howell
Attorney, Agent, or Firm—Nixon & Vanderhye P.C.

[57] ABSTRACT

A method and apparatus for controlling the penetration depth of a cutting tool of a numerically controlled machine. A substantially cylindrical collar extends around at least part of the cutting tool with the collar being axially movable with respect to the axis of rotation of the cutting tool. An electronic sensor, secured to a non-rotatable housing of the numerically controlled machine transmits a signal to terminate further penetration of the cutting tool. The sensor is situated adjacent the collar and axially rearward thereof. A locking pin is provided for preventing an axially rearward end of the collar from touching an axially forward end of the electronic sensor when the collar is not being subjected to a force acting in a rearward axial direction. A nose bush for pre-positioning of the collar relative to the cutting tool in the axial direction is advantageously provided.

29 Claims, 3 Drawing Sheets

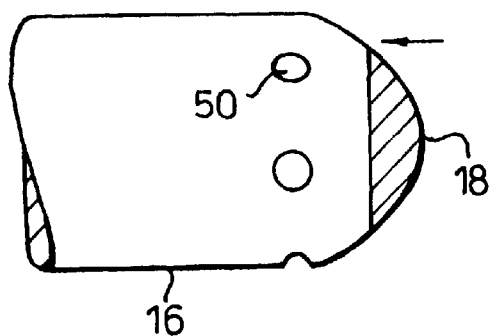
Fig.3a.
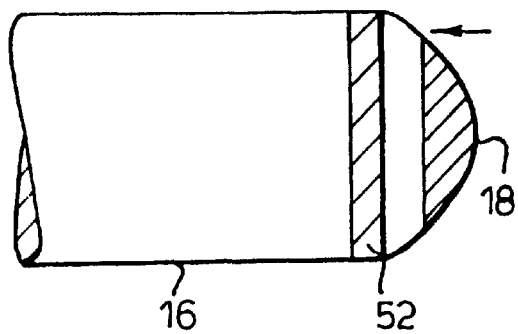
Fig.3b.
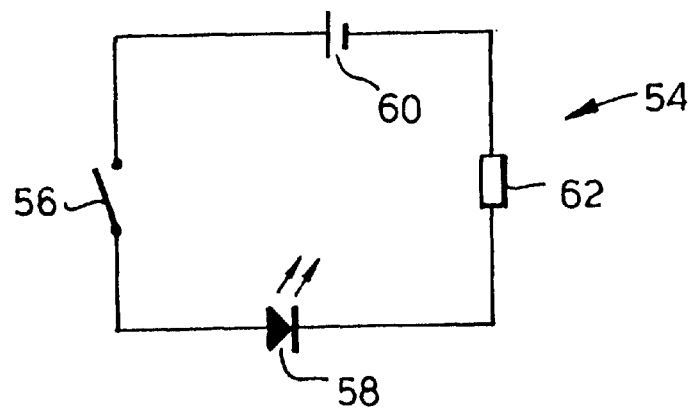
Fig.4.
Fig.5.
| x | y | z | z_act |
|---|---|---|---|
| 170 | 180 | 25 | 24 |
| 170 | 185 | 23 | 23 |
| 170 | 190 | 20 | 19 |

ELECTRONICALLY TRIGGERED SURFACE SENSOR UNIT

This is a continuation of PCT application PCT/GB99/02061, filed Jun. 30, 1999, the entire content of which is hereby incorporated by reference in this application.

BACKGROUND OF THE INVENTION

1. Field of the Invention

The present invention relates to Numerically Controlled (NC) machines, and more particularly to the drilling, reaming and countersinking of holes by such machines.

2. Discussion of Prior Art

NC machines are commonly used in many manufacturing applications, especially for forming edges, drilling holes and creating surface features. An article to be manufactured is designed for example using a computer software package, and then data defining the design is communicated to an NC machine, which is also given datum co-ordinates to allow the article to be manufactured accurately.

In aerospace applications, it is common to use NC machines to locate and drill holes for details and assemblies. Often for aerodynamic efficiency reasons, it is necessary to provide surface countersinking of holes for external panels and skins, so that the surfaces of fasteners when located in the holes are flush with the surface of the surrounding panels or skin.

To achieve the aerodynamic effect of a smooth surface, the depth of the countersink must be extremely accurate. Indeed, the tolerances generally required are such that the surface of the countersunk fastener must be within 0.1 mm of the surface of the surrounding panel or skin. It is very difficult to achieve these tolerances, as the surface of the panel or skin being drilled may be curved, may not be of uniform thickness or may have surface inconsistencies. The thickness of the material to be drilled may vary within the tolerance band throughout its length, but as tolerances have a cumulative effect, any deviation from the nominal thickness will result in the tolerance band of the countersink being reduced, making it even more difficult to achieve the desired result from the countersinking process.

To accurately drill and countersink, it is desirable to know the exact position of points on the surface of the material at which it is to be drilled. The NC machine is programmed with the x and y co-ordinates of the hole as well as the depth to which is to be drilled in the z direction, on the assumption that the surface of the material is regular and is to be found at a particular value of z with respect to the datum. However, if the material has a within-tolerance surface dip at the x, y co-ordinates given for drilling and countersinking, then the countersink tool will not penetrate far enough into the drilled hole to allow the surface of a fastener located in it to fit flush with the rest of the surface of the material. The fastener will instead stand proud of the surface of the material and may, in use, produce unwanted aerodynamic effects. Similarly, if the material has a slight surface rise at the given x, y co-ordinates, then the drilling and countersinking tools will penetrate too far into the material resulting in a hole that is too deep, so that the surface of a fastener located in it will be positioned below the surface of the material.

There are currently two known methods for establishing the variation of surface contour with the x, y position of points on the surface of a material to overcome the problems described above. The first method is to use a commercially available surface sensor unit to ensure that the hole is drilled and countersunk to the correct depth. Currently available surface sensors fit easily on to the arbor holding the cutting tool, and operate mechanically, generally either by compressing a spring or by moving a piston to effectively decouple the cutting tool from the arbor and thus allowing the arbor to move relative to the cutting tool. To achieve this, the sensor has a nose slidably located on the non-rotating housing around the cutting tool. As the drill moves forwards, upon touching the article being drilled, the nose ceases forward movement and the housing slides forwards relative to the nose and the cutter, decoupling the arbor from the cutter and thus preventing further drilling. The NC machine is programmed to retract at a position beyond the actual depth to be drilled but within the collapse range of the surface sensor.

These mechanical sensors tend to be heavy and bulky, and to be prone to mechanical problems and inaccuracies during drilling, because they need several moving parts to operate. The speed of rotation of the cutting tool is also limited by having the mechanical sensor on the arbor, as is the accuracy of drilling at high speeds.

It has been found that directly drilling and countersinking in one operation generally produces holes outside of the tolerances required. Accordingly, it is necessary to pre-drill the hole first and then ream countersink to the desired size as a second operation. The reamer follows the pre-drilled hole and consistently produces holes within tolerance. It is both costly and time consuming to employ two cutting tools, and the preferred way of manufacturing countersunk holes would certainly involve using a drill/countersink to produce the hole directly using one tool only.

The second method is to probe the surface of the material at every point in the x, y plane where a hole is to be located, to find out the exact local surface position in the z direction at each of these points. The variation between the measured surface position and the programmed values of the z co-ordinate at each point can then be added to the data used to control the NC machine. This allows a drill/countersink tool to be used to produce a finished hole needing only one tool, as preferred. Probing may be undertaken on a commercially available Co-ordinate Measuring Machine (CMM), used generally for inspection, and fitted with a sensitive probe capable of communicating its exact location. However, probing the surface of the material at every potential hole position is extremely time consuming, and not suitable for the production of objects having many holes, such as aircraft skins and panels. Additionally, if a CMM is used, this method requires that the article be removed from the NC machine and the holding tool used for its initial production and then be accurately placed on the CMM, to allow probing of the potential hole locations, before being fitted back into its holder and being accurately positioned again relative to the NC machine. This is a time consuming operation, and may generate further tolerance problems due to these repositioning operations.

Additionally, after manufacture, there is generally a requirement for the panel or skin to be inspected. This would usually involve the article being removed from the NC machine and placed on a CMM, for inspection by probe. The position of the holes and from this the general shape of the article can be sensed by the probe. The inspection, though usually necessary, is extremely time consuming.

SUMMARY OF THE INVENTION

The present invention seeks to provide apparatus for allowing holes to be more quickly and accurately drilled and countersunk in a surface and for that surface to be inspected more readily than is possible with the above known apparatus, and moreover, in a single operation. The present invention further seeks to provide a method for more quickly and accurately drilling, countersinking and inspecting the surface around the holes, without the need to remove the article under manufacture from its holder or from its position relative to the NC machine for probing or inspection.

According to the present invention in one aspect thereof, there is provided a surface sensor unit for controlling the penetration depth of a cutting tool of a numerically controlled machine, comprising a substantially cylindrical collar extending around at least part of the cutting tool, said collar being axially movable, with respect to the axis of rotation of the cutting tool, an electronic sensor secured to a non-rotatable housing of the numerically controlled machine, said sensor being capable of communicating or having a communication device connected thereto, said sensor being situated adjacent the collar and axially rearward thereof, restraining means for preventing an axially rearward end of the collar from touching an axially forward end of the electronic sensor when the collar is not being subjected to a force acting in the rearward axial direction, and depth control means for pre-positioning of the collar relative to the cutting tool in the axial direction.

Preferably the collar comprises at least two parts, an axially rearward portion axially slidable along the housing and an axially forward portion which is movably connected to the axially rearward portion and extends axially forwards around at least part of the cutting tool.

The axially forward portion of the collar is preferably able to move in an axial direction relative to the rearward portion, such that the collar may be extended or retracted in the axial direction without movement of the rearward portion. The depth control means may then be adapted to allow the accurate axial movement of the forward portion independent of the rearward portion. Preferably there is then further provided locking means for locking the forward portion relative to the rearward portion so that the portions are unable to move independently and the forward portion is constrained to slide in an axial direction with the rear portion.

Preferably the depth control means comprises the two part collar described above wherein the forward portion is threaded onto the rearward portion and an index ring is provided for moving the forward portion accurately relative to the rearward portion. The locking means may then comprise a locking ring, which has to be disengaged before the depth control means can be adjusted.

The rearward portion of the collar is preferably fixed to the non-rotatable housing in such a way that allows the collar to slide in a rearward axial direction but is prevented from forward axial movement beyond a calibrated limit, to prevent the collar from sliding off the housing during operation of the NC machine. A locking pin may be used for this purpose.

Preferably the restraining means employed exerts enough forward axial force on the rearward portion of the collar so that, without experiencing a rearwardly directed axial force, the normal position of the rearward portion is at its axially forward limit. Said means may comprise a spring, which may be advantageously situated radially adjacent or alternatively around the electronic sensor, preferably being positioned to extend and compress in an axial direction and may be fixed to the housing at its axially rearward end and to the rearward portion of the collar at its axially forward end. Said restraining means may alternatively comprise a piston and valve arrangement. Said restraining means are preferably sensitive enough to immediately respond to a small force acting in the rearward axial direction.

The electronic sensor is preferably adapted to transmit a signal, when its axially forward end is touched, to a suitably located receiving unit which may communicate with or be a part of the control system for the NC machine, to request immediate retraction of the cutting tool. The signal may be an infrared signal, or an inductive transmission, or a radio signal. Alternatively cables may be run from the electronic sensor to the control system of the NC machine to transmit the signal directly in the form of an electric current.

Preferably the electronic sensor comprises a biased plunger operated micro-switch connected in series with a light emitting diode (LED) and a power source. The diode and power source are preferably located within the body of the micro-switch. The micro-switch is positioned so as to be closed when its plunger is touched by a co-operating member of the surface sensor tool. Upon closure of the switch the circuit is completed and the LED emits radiation. The radiation emitted by the LED is preferably transmitted from within the electronic sensor via at least one window in the electronic sensor transparent to said radiation. The emitted radiation is advantageously detected by a suitably located radiation detector unit e.g. a light sensitive transistor.

At the instant when the electronic sensor is touched, its position is preferably recorded by the control system of the NC machine and compared to co-ordinates stored by the NC machine program defining the manufacture of an article currently being manufactured. This enables simultaneous manufacture and inspection of the article being manufactured.

Advantageously, flexible seals are used to prevent coolant used during drilling and countersinking operations from reaching the electronic sensor.

According to the invention in another aspect thereof, there is provided a method for controlling the penetration depth of a cutting tool of a numerically controlled machine, comprising the steps of:

setting the axial position of a movable collar extending axially along at least part of the cutting tool;

moving the cutting tool axially forward to cut into a surface of an article being manufactured until the cutting tool reaches the desired depth and the collar touches the surface;

providing sliding means on the cutting tool enabling the collar to slide axially at relative to the cutting tool as it continues to advance and the collar is pressed against the surface of the article;

providing an electronic sensor being capable of communicating or having a communication device connected thereto, and being situated axially adjacent and rearwards of the collar and in fixed relationship to the advancing cutting tool; and, providing restraining means for preventing the collar from touching the electronic sensor until the cutting tool penetrates the article to the desired depth of penetration and the collar makes contact with the electronic sensor, causing the sensor to send a signal to a control system of the numerically controlled machine to request immediate retraction of the cutting tool.

Preferably a shadowgraph is used to allow the collar to be accurately positioned axially with respect to the cutting tool before use. The distance between the collar and the sensor is preferably taken into account during positioning of the collar as this distance must be covered by the collar before the sensor makes contact with the collar and sends a signal to the NC machine.

The cutting tool may be a drill, reamer, countersink or any combination of these. Preferably the cutting tool is a drill/countersink tool.

The position of the electronic sensor may be advantageously recorded at the instant it transmits a signal to the control system of the NC machine. This information is advantageously compared with co-ordinates given in a NC machine program for the manufacture of an article, to allow simultaneous manufacture and inspection of the article.

A safety factor is preferably included in the NC machine program, so that the cutting tool will not necessarily continue to penetrate the article until a retraction signal is sent, but will retract at a given co-ordinate even if the sensor has not been activated. This can prevent articles being machined beyond the tolerance limit and having to be scrapped if the electronic sensor is not working, for example.

BRIEF DESCRIPTION OF THE DRAWINGS

In order that the present invention may be more fully understood, an embodiment will now be described by way of illustration only and with reference to the accompanying drawings of which:

FIG. 3a shows an electronic sensor;

FIG. 3b shows an alternative electronic sensor;

FIG. 4 is a circuit diagram illustrating an electrical circuit for use with an electronic sensor; and, FIG. 5 shows part of a table of co-ordinates relating to an article being manufactured.

DETAILED DESCRIPTION OF THE PREFERRED EMBODIMENTS

Figure 1:
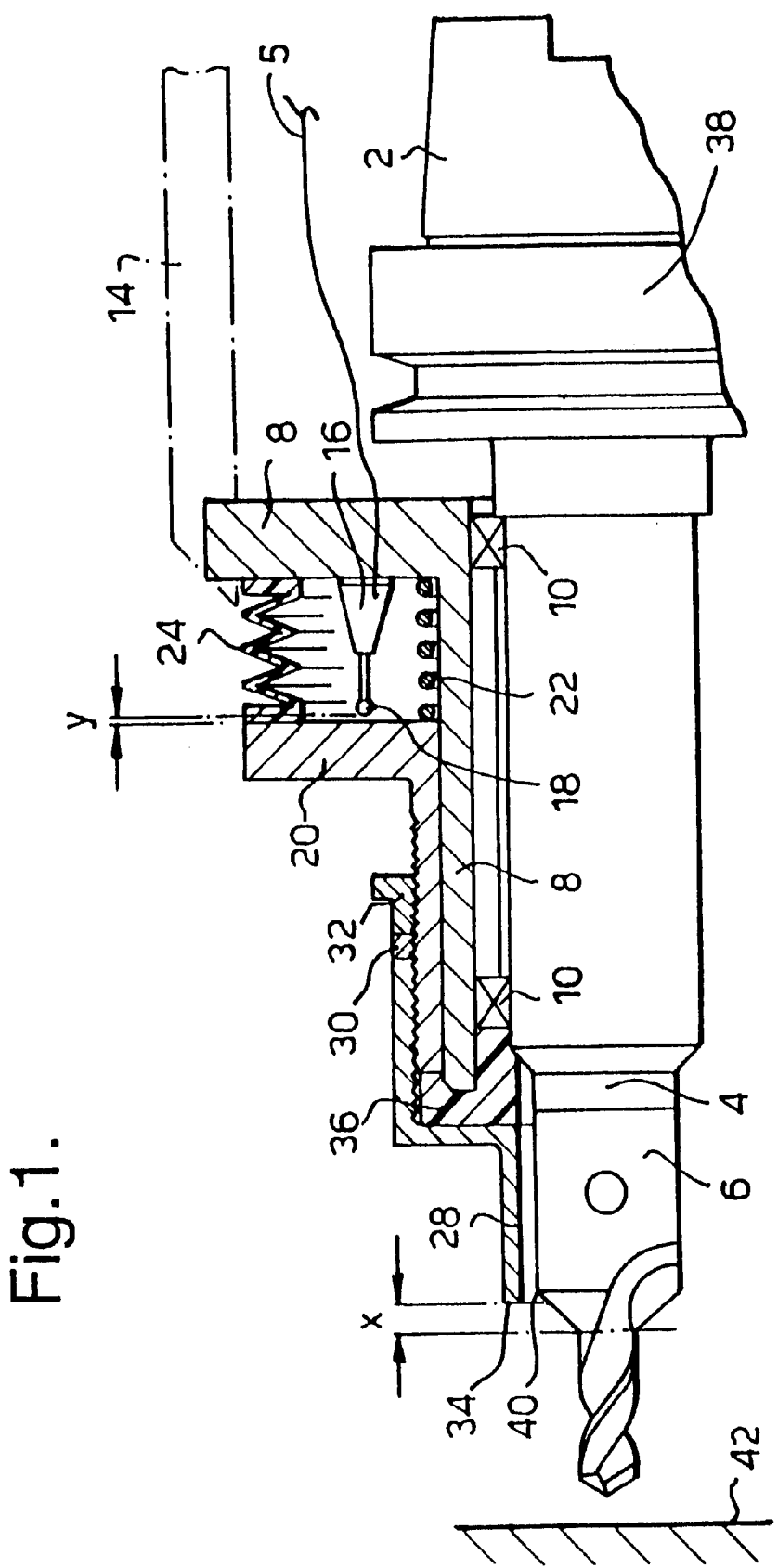
FIG. 1 shows a schematic sectioned side view of an arbor and housing incorporating a sensor unit.
Figure 2:
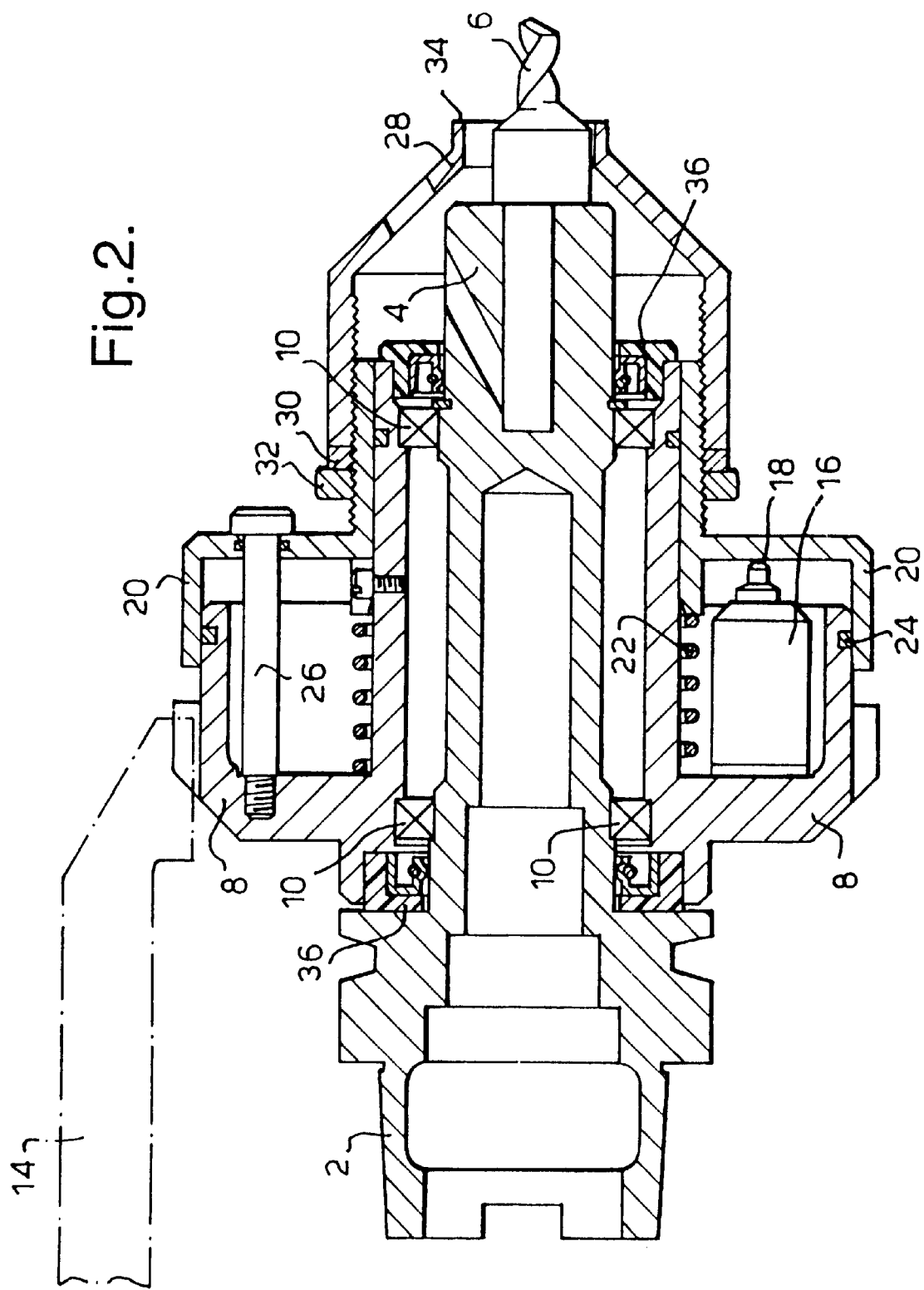
FIG. 2 shows a section through an arbor and housing in the axial direction.

Referring to FIGS. 1 and 2 of the drawings in which features which are the same in both are for the reader's convenience denoted by common reference numerals, a drill/countersink cutting tool 6 is fitted into the chuck 4 of the arbor 2 of a numerically controlled machine (not shown). Fitted around the arbor 2 is a housing 8, with bearings 10 situated between the arbor 2 and the housing 8. The bearings 10 are protected from coolant fluid by a flexible seal 36.

The numerically controlled machine has a timing arm 14 which engages the housing 8 and prevents rotation of the housing 8 with the arbor 2. Attached to the housing 8 is an electronic sensor 16 having a forward tip 18. A cylindrical slider 20 is situated axially forward of the sensor tip 18, and is free to travel in the axial direction along the housing 8. The slider 20 is kept at a distance y from the sensor tip 18 by a spring 22, which is fitted between the slider 20 and the housing 8. The sensor 16 is protected from the manufacturing environment by a flexible seal 24. A locking pin 26 (shown on FIG. 2 only) prevents the slider 20 from moving too far forward along the housing 8 during operation of the numerically controlled machine. A cylindrical nose bush 28 is threaded on to the slider 20 and may be moved axially relative to the slider 20 by an index ring 30, so that the nose bush 28 can be placed in the desired position relative to the cutting tool 6. The nose bush 28 can be locked to the slider 20 by a locking ring 32 to prevent relative axial movement between the slider 20 and the nose bush 28. It will be seen that the cylindrical slider and nose bush together form a collar unit slidably mounted on the housing.

Referring now to FIG. 1, in operation, the slider 20 is initially held at an axial distance y from the sensor tip 18 by the spring 22. The locking ring 32 is released allowing the nose bush 28 to be moved in the axial direction relative to the slider 20 using the index ring 30. The cutting tool 6 is desired to countersink to a distance x, as shown. The nose bush 28 is positioned on the slider 20 so that the cutting tool 6 will penetrate just to the rearward end of the countersink 40 before the forward end 34 of the nose bush 28 touches the surface of an article under manufacture 42. The nose bush 28 is then locked to the slider 20, by the locking ring 32, so that the nose bush 28 and the slider 20 may move together in the axial direction.

For the nose bush 28 to be correctly positioned, its forward end 34 must be at the same axial distance from the gauge line of the numerically controlled machine 28 as the rearward end of the countersink 40, plus the distance y. This may be achieved for example by using a shadow graph.

As the cutting tool 6 drills and countersinks a hole in the article 42, the forward end 34 of the nose bush 28 eventually comes into contact with the surface of the article 42 and the collar unit 28, 20 is prevented from further forward movement. The housing 8 however continues to advance with the cutting tool against the action of the spring 22, until after advancing a distance y, the sensor tip 18 comes into contact with the stationary slider 20. This will occur when the cutting tool 6 has penetrated the object 42 just as far as the rearward end 40 of the countersink.

As the sensor tip 18 touches the slider 20, the sensor 16 responds by enabling a signal to be sent by cable 5 in FIG. 1 to the control system of the numerically controlled machine which overrides the control program for the manufacture of the article and causes immediate retraction of the cutting tool 6.

In another embodiment, the sensor 16 comprises a micro-switch 56, which forms part of a circuit 54 shown in FIG. 4, which also includes a LED 58, a current limiting resistor 62, and a power source 60. The micro-switch 56 has a biased plunger 18 which closes the switch when its forward tip is touched, the plunger moving in the direction shown by the arrow to close the switch. When the switch is closed, the LED 58 emits infra-red radiation.

The LED 58, resistor 62 and power source 60 may be housed within the body of the sensor 16, which may have windows 50 as shown in FIG. 3a positioned around the part of the sensor where the LED 58 is housed for allowing the infra-red radiation to be transmitted from within the sensor and to be detected by a remote detector (not shown). Alternatively the sensor 16 may have a transparent band 52 for allowing the infra-red radiation to be transmitted in all directions around the sensor 16, giving a greater choice of location of one or more detectors (not shown).

The control system of the NC machine further records the location of the sensor 16 when the signal is sent, relative to a fixed datum given at the start of the NC program. The distance between the nose bush 28 and the sensor 16 is calibrated and that distance and the recorded position of the sensor 16 are used to calculate the exact position of the bottom of the hole relative to the fixed datum. The control system of the NC machine can then compare the actual co-ordinates of the bottom of the hole with the ones given in the NC machine program.

FIG. 5 shows a table that may be used by the control system of the NC machine for recording and comparing co-ordinates. The x, y and z co-ordinates of holes to be drilled are part of the instructions given in the NC machine program. As each hole is completed, on receipt of the infra-red signal from the sensor, the control system records the actual z co-ordinate (zact) of the bottom of the hole. The control system can then compare the z co-ordinate of the program with the actual z co-ordinate, and may further be given tolerances which are acceptable. If any point is out of tolerance, the control system indicates this to an operator of the NC machine.

Using this information the exact position and depth of the holes and the shape of the surface of the article is precisely known, making further inspection unnecessary.

What is claimed is:

1. A surface sensor unit for controlling the penetration depth of a cutting tool of a numerically controlled machine, said sensor unit comprising:

a substantially cylindrical collar extending around at least part of the cutting tool, said collar being axially movable with respect to the axis of rotation of the cutting tool;

an electronic sensor secured to a non-rotatable housing of a numerically controlled machine, said sensor being capable of transmitting an end of penetration signal to said machine upon contact between said sensor and said collar, said sensor being situated adjacent the collar and axially rearward thereof;

restraining means for preventing an axially rearward end of the collar from touching an axially forward end of the electronic sensor when the collar is not being subjected to a force acting in the rearward axial direction; and depth control means for pre-positioning of the collar relative to the cutting tool in the axial direction.

2. A surface sensor unit as claimed in claim 1 wherein said collar comprises at least an axially rearward portion and an axially forward portion, said axially forward portion being movably connected to said axially rearward portion.

3. A surface sensor unit as claimed in claim 2 wherein said axially rearward portion of said collar is axially slidable along said non-rotatable housing.

4. A surface sensor unit as claimed in claim 2 wherein said axially forward portion of said collar extends axially forward around at least part of said cutting tool.

5. A surface sensor unit as claimed in claim 2 wherein the axially forward portion of the collar is able to move in an axial direction relative to the rearward portion, such that the collar may be extended or retracted in the axial direction without movement of the rearward portion.

6. A surface sensor unit as claimed in claim 2 wherein said depth control means are adapted to allow the accurate axial movement of the forward portion independent of the rearward portion.

7. A surface sensor unit as claimed in claim 6 wherein said depth control means allow said forward portion to be threaded on to the rearward portion and said depth control means further provide an index ring for moving the forward portion accurately relative to the rearward portion.

8. A surface sensor unit as claimed in claim 7 wherein said depth control means comprise locking means for locking the forward portion relative to the rearward portion so that the portions are unable to move independently and the forward portion is constrained to slide in an axial direction with the rear portion.

9. A surface sensor unit as claimed in claim 8 wherein said locking means comprises a locking ring.

10. A surface sensor unit as claimed in claim 1 wherein said restraining means comprises a spring.

11. A method of controlling the penetration depth of a cutting tool of a numerically controlled machine, comprising the steps of:

setting the axial position of a movable collar extending axially along at least part of the cutting tool;

moving the cutting tool axially forward to cut into a surface of an article being manufactured until the cutting tool reaches the desired depth and the collar touches the surface;

sliding said collar to slide axially relative to the cutting tool as the cutting tool continues to advance and the collar contacts the surface of the article;

providing an electronic sensor being capable of transmitting an end of penetration signal to said machine, and being situated axially adjacent and rearwards of the collar and in fixed relationship to the advancing cutting tool; and biasing the collar from touching the electronic sensor until the cutting tool penetrates the article to the desired depth of penetration and the collar makes contact with the electronic sensor, causing the sensor to send a signal to a control system of the numerically controlled machine to request immediate retraction of the cutting tool.

12. A surface sensor unit as claimed in claim 1 wherein said electronic sensor is adapted to transmit a signal, when its axially forward end is touched, to a suitably located receiving unit which communicates with or is a part of a control system for the NC machine, to request immediate retraction of the cutting tool.

13. A surface sensor unit as claimed in claim 12 wherein the signal is an infra-red signal.

14. A surface sensor unit for controlling the penetration depth of a cutting tool of a numerically controlled machine, comprising:

a substantially cylindrical collar extending around at least part of the cutting tool, said collar being axially movable with respect to the axis of rotation of the cutting tool;

an electronic sensor secured to a non-rotatable housing of a numerically controlled machine, said sensor being capable of transmitting an end of penetration signal to said machine upon contact between said sensor and said collar, said sensor being situated adjacent the collar and axially rearward thereof;

a biasing spring for preventing an axially rearward end of the collar from touching an axially forward end of the electronic sensor when the collar is not being subjected to a force acting in the rearward axial direction; and a nose bush for pre-positioning of the collar relative to the cutting tool in the axial direction.

15. A surface sensor unit as claimed in claim 12 wherein the signal is a radio signal.

16. A surface sensor unit as claimed in claim 12 wherein a cable is run from the electronic sensor to the control system of the NC machine to transmit the signal in the form of an electric current.

17. A surface sensor unit as claimed in claim 12 wherein the electronic sensor comprises a biased plunger operated micro-switch, connected in series with a light emitting diode and a power source.

18. A surface sensor unit as claimed in claim 17 wherein the micro-switch is positioned so as to be closed when its plunger is touched by a co-operating member of the unit.

19. A surface sensor unit as claimed in claim 17 wherein the light emitting diode emits radiation upon closure of said micro-switch.

20. A surface sensor unit as claimed in claim 19 wherein the electronic sensor comprises at least one window, said window comprising a substantially transparent material adapted to allow the emitted radiation to pass through.

21. A surface sensor unit as claimed in claim 20 wherein said emitted radiation is detected by said suitably located receiving unit.

22. A surface sensor unit as claimed in claim 1 wherein the position of the electronic sensor is recorded by the control system of the NC machine when the electronic sensor is touched.

23. A surface sensor unit as claimed in claim 22 wherein said position of the electronic sensor is compared to co-ordinates given in a NC machine program for the manufacture of an article currently being manufactured, for allowing simultaneous manufacture and inspection of the article.

24. A surface sensor unit as claimed in claim 1 wherein flexible seals are used to prevent coolant used during drilling and countersinking operations from reaching the electronic sensor.

25. A method of controlling the penetration depth of a cutting tool of a numerically controlled machine, comprising the steps of:

setting the axial position of a movable collar extending axially along at least part of the cutting tool;

moving the cutting tool axially forward to cut into a surface of an article being manufactured until the cutting tool reaches the desired depth and the collar touches the surface;

providing sliding means on the cutting tool for enabling the collar to slide axially relative to the cutting tool as it continues to advance and the collar is pressed against the surface of the article;

providing an electronic sensor being capable of transmitting an end of penetration signal to said machine, and being situated axially adjacent and rearwards of the collar and in fixed relationship to the advancing cutting tool; and providing restraining means for preventing the collar from touching the electronic sensor until the cutting tool penetrates the article to the desired depth of penetration and the collar makes contact with the electronic sensor, causing the sensor to send a signal to a control system of the numerically controlled machine to request immediate retraction of the cutting tool.

26. A method for controlling the penetration depth of a cutting tool of a numerically controlled machine as claimed in claim 25 wherein a shadowgraph is used to allow the collar to be accurately positioned axially with respect to the cutting tool before use.

27. A method for controlling the penetration depth of a cutting tool of a numerically controlled machine as claimed in claim 25 wherein the position of the electronic sensor is recorded at the instant it transmits a signal to the control system of the NC machine.

28. A method for controlling the penetration depth of a cutting tool of a numerically controlled machine as claimed in claim 27 wherein said position of the electronic sensor is compared with co-ordinates given in a NC machine program for the manufacture of the article, for allowing simultaneous manufacture and inspection of the article.

29. A method for controlling the penetration depth of a cutting tool of a numerically controlled machine as claimed in claim 25 wherein a safety factor is included in the NC machine program, so that the cutting tool will not necessarily continue to penetrate the article until a retraction signal is sent, but will retract at a given coordinate even if the sensor has not been activated.

* * * * *